2,805,215

ADDITION COPOLYMERS OF ALLYLOXAMIC ACID HYDRAZIDES

John R. Caldwell and Edward H. Hill, Kingsport, Tenn., assignors to Eastman Kodak Company, Rochester, N. Y., a corporation of New Jersey No Drawing. Application April 18, 1956, Serial No. 578,894

12 Claims. (Cl. 260—78)

This invention relates to resinous copolymers of hydrazides of allyloxamic acid, and to a process for preparing these compounds.

The new resinous copolymers of the invention comprise a substantial proportion of an allyloxamic acid hydrazide represented by the following general formula:

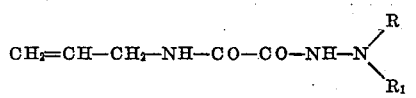

wherein R and $R_1$ each represents a hydrogen atom, an alkyl group containing from 1 to 4 carbon atoms or an aryl group containing from 6 to 7 carbon atoms, e. g. methyl, ethyl, propyl, isopropyl, n-butyl, phenyl, p-tolyl, o-tolyl, etc. groups, in combination with various different polymerizable, unsaturated monomers (comonomers), other than the above defined allyloxamic acid hydrazides, such as vinyl monomers, acrylic monomers, etc., in the proportions by weight of from 4 to 30%, but preferably from 8 to 15% of the above defined hydrazides and from 96 to 70%, but preferably from 92 to 85% of the other different monomers (comonomers). The copolymeric products of the invention are soluble in one or more common organic solvents such as acetone, ethyl acetate, cyclohexanone, etc. and those copolymers containing a large proportion (60% or more) of acrylonitrile are soluble in polyacrylonitrile solvents such as dimethylformamide, dimethylacetamide, γ-butyrolactone, dimethylsulfolane, etc., from which solutions they can be readily cast into films that are useful for wrapping materials and as photographic film supports, and the acrylonitrile containing copolymers spun into fibers having good affinity for various textile dyes. As little as 4% of the hydrazides of allyloxamic acid in the copolymers result in markedly improved dyeing properties with little or no lowering of the softening point even up to 15% of the hydrazides, whereas with the usual acrylic acid amide copolymers with other vinyl monomers it is necessary to incorporate at least 15–20% of the acrylic acid amide modifier to obtain equivalent good dyeing which amount is sufficiently great to cause a significant and undesirable lowering of the softening point.

It is, accordingly, an object of the invention to provide new resinous copolymers having excellent affinity for dyes and good physical properties. Another object is to provide a method for preparing the same. Other objects will become apparent hereinafter.

In accordance with the invention, we prepare our new resinous copolymers by copolymerizing from 4 to 30% by weight, but preferably from 8 to 15%, of one or more of the above defined hydrazides of allyloxamic acid with from 96 to 70% by weight, but preferably from 92 to 85%, of one or more other different polymerizable comonomers. The hydrazides of allyloxamic acid can be prepared by reacting an alkyl allyloxamate such as ethyl allyloxamate with a hydrazine compound, in approximately equimolar proportions, but preferably with a slight excess of the hydrazine compound, at a temperature of from approximately room temperatures to about 160° C., the product being obtained in the form of crystals which are purified by recrystallization from appropriate solvents. Further details for the preparation of the hydrazides of allyloxamic acid may be had by reference to copending application Serial No. 578,898, of John R. Caldwell and Winston J. Jackson, Jr., filed of even date herewith.

The copolymerizations for preparing our new resinous copolymers are accelerated by heat, by actinic light and by polymerization catalysts such as peroxides including benzoyl peroxide, acetyl peroxide, lauroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali metal perborates, the water-soluble salts of percarbonic acid, the water-soluble salts of perphosphoric acid, azo-bis-isobutyronitrile, etc. Mixtures of one or more of the catalysts can be employed. The amount of catalyst employed can vary from about 0.2 to 3.0 percent, based on the weight of monomer to be polymerized. An activating agent such as sodium bisulfite can be used, if desired, in conjunction with the polymerization catalysts in aqueous systems. For mass polymerizations, an organic peroxide is preferred. The temperature of polymerization can vary over a wide range, but preferably the polymerizations are carried out at from about 30°–100° C. Chain regulators such as alkyl mercaptans (e. g. hexyl, octyl, lauryl, dodecyl mercaptans, etc.) can also be added with advantage to the polymerization mixtures.

The polymerizations can be carried out in mass or in dispersed form in a nonsolvent for the monomers, the particles of dispersed monomer being very small (emulsion) or relatively large (bead or granular). For dispersion polymerizations, any nonsolvent for the monomers can be employed, water being an especially suitable nonsolvent. Advantageously, an emulsifying or dispersing agent is added to the polymerization mixtures in an amount not exceeding about 3 percent of the weight of monomers. Suitable emulsifying agents include salts of higher fatty acid (e. g. sodium or potassium stearate, palmitate etc.), ordinary soaps, salts of higher fatty alcohol sulfates (e. g. sodium or potassium cetyl sulfate, sodium or potassium lauryl sulfate, sodium or potassium stearyl sulfate, etc.), salts or aromatic sulfonic acids (e. g. sodium or potassium salts of alkylnaphthalene sulfonic acids, etc.), higher molecular weight quaternary ammonium salts (e. g. dimethyl benzylphenyl ammonium chloride, quaternary ammonium salts containing the radicals $C_{15}H_{31}$ and $C_{17}H_{35}$, etc.) or dispersing agents such as starch, methylated starch, gum arabic, finely divided magnesium carbonate, polyvinyl alcohol, and the like. Mixtures of emulsifying and dispersing agent can be used. Stirring, shaking or tumbling of the polymerization mixture during the polymerization reaction gives improved product and yield.

The comonomers that are suitable for copolymerizing with the hydrazides of allyloxamic acid to give the above defined resinous copolymers of the invention are different polymerizable compounds containing ethylenic unsaturation, i. e. at least one aliphatic —CH=C< group, but preferably those containing but a single aliphatic $CH_2$=C< group, for example, one or more comonomers from the group including vinyl esters of carboxylic acid (e. g.) vinyl acetate, vinyl propionate, vinyl butyrate, vinyl stearate, vinyl trifluoracetate, vinyl benzoate, etc.), vinyl alkyl ketones (e. g. methyl vinyl ketone, ethyl vinyl ketone, etc.), vinyl alkyl ethers (e. g. methyl vinyl ether, butyl vinyl ether, etc.), vinyl sulfonamides (e. g. vinyl sulfonamide, N-methyl vinyl sulfonamide, etc.), vinyl halides (e. g. vinyl chloride, vinyl bromide, vinyl fluoride), vinylidene halides (e. g. vinylidene dichloride, vinylidene dibromide, vinylidene chloride-bromide, vinylidene difluoride, etc.), vinyl urethanes (e. g. vinyl methyl urethane, vinyl ethyl urethane, etc.), cyclic vinyl imides (e.g. vinyl succinimide, vinyl phthalimide, etc.), N-vinyl lactams, acrylic acid an derivatives thereof such as the amide, N-alkyl amides, nitrile and methyl, ethyl, propyl, butyl, benzyl, phenyl etc. esters and the corresponding compounds of methacrylic acid, maleic acid, fumaric acid, itaconic acid and citraconic acid, esteramides such as fumaramates, malemates, itaconamates, citroconamates, etc., vinyl pyridines, vinyl sulfones, hydrazides of acrylic and methacrylic acids, ethylene, isobutylene, isoprene, butadiene, 2-chlorobutadiene, 2,3-dimethyl-butadiene, etc. In general, the copolymeric products contain about the same proportions of components as are contained in the starting copolymerization mixtures.

The following examples will serve to illustrate further our new resinous copolymers and the manner of preparing the same.

*Example 1*

A mixture consisting of 18 g. of acrylonitrile, 2 g. of allyloxamic acid hydrazide, 0.2 g. of potassium persulfate, 0.1 g. of sodium bisulfite, 0.4 g. of sodium lauryl sulfate and 150 cc. of water was placed into a sealed bottle, and the bottle tumbled in a water bath at 55°–60° C. for a period of 24 hours. The copolymeric product was precipitated by adding sodium sulfate, washed and dried. It weighed 17.5 g. and was soluble in dimethylformamide, in γ-butyrolactone and in dimethylsulfolane. Analysis showed the copolymer contained 9% by weight of the hydrazide, the remainder being acrylonitrile.

The above copolymer was dissolved in dimethylformamide in weight proportions of 1 to 5 and the solution extruded through a spinneret into a precipitating bath consisting of 60 parts by weight of water and 40 parts by weight of dimethylformamide. The resulting fibers were washed, dried, and drafted 300% in a heated chamber. The fibers dyed well with acid wool dyes, cellulose acetate dyes, direct cotton dyes, and vat dyes. The fibers had a hot bar sticking temperature of 225° C.

*Example 2*

5.0 g. of allyloxamic acid phenylhydrazide, 45.0 g. of acrylonitrile, 0.5 g. of azo-bis-isobutyronitrile were dissolved in 100 cc. of tertiary butyl alcohol. The solution was heated at 50° C. for 24 hours. The precipitate of copolymer obtained was filtered off, washed with methanol and dried, to give a yield of 42 g. Analysis showed that it consisted of about 91.5% by weight of acrylonitrile and and 8.5% of the hydrazide. Fibers spun from a solution of the copolymer in dimethylformamide dyed well with the dyes listed in Example 1.

*Example 3*

A mixture consisting of 2.0 g. of allyloxamic acid dimethylhydrazide, 28.0 g. of vinylidene chloride, 0.5 g. of sodium dodecyl sulfate, 0.5 g. of potassium persulfate, 0.25 g. of sodium bisulfite and 200 cc. of water was tumbled in a sealed bottle at 50° C. for 24 hours. The copolymeric product was precipitated from the emulsion with sodium sulfate, washed and dried. It weighed 27 g. Analysis showed that the copolymer consisted of about 95% by weight of vinylidene chloride and 5% of the hydrazide. Fibers spun therefrom dyed well with acid wool dyes. The fibers had a softening point of 190° C.

*Example 4*

A mixture consisting of 7.0 g. of allyloxamic acid n-butylhydrazide, 93.0 g. of vinyl chloride, 2.0 g. of sulfonated mineral oil, 1.0 g. of potassium persulfate and 800 cc. of water was placed into an autoclave and stirred at 60° C. for 20 hours. A yield of 85 g. of copolymer was obtained. The copolymer was soluble in cyclohexanone and gave clear, tough films that were useful as photographic film support and that dyed readily with wool and cellulose acetate dyes.

*Example 5*

20.0 g. of methyl acrylate and 3.0 g. of allyloxamic acid diphenylhydrazide were placed in a bottle and 0.5 g. of azo-bis-isobutyronitrile and 50 c. of acetone were added. The resulting solution was heated at 50° C. for 50 hours. A clear, high viscosity dope of copolymer having about 87% by weight of methyl acrylate was produced. Films coated from the dope were tough and flexible and could be dyed heavily with acid wool and cellulose acetate dyes. It was useful as a packaging material.

*Example 6*

Using the method described in Example 5, a ternary copolymer was made from a mixture consisting of 70 parts by weight of ethyl acrylate, 20 parts by weight of acrylonitrile and 10 parts by weight of allyloxamic acid methyl-p-tolylhydrazide. Films cast from the resulting copolymeric dope had a sticking point of 140° C. and were tough and flexible.

*Example 7*

A mixture consisting of 60.0 g. of acrylonitrile, 30.0 g. of allyloxamic acid dimethylhydrazide, 10.0 g. of divinyl benzene, 2.0 g. of lauryl sodium sulfate, 1.0 g. of potassium persulfate, 1.0 g. of sodium bisulfite and 800 cc. of water was heated in a bottle at 60°–65° C., with stirring, for 10 hours. The ternary copolymer obtained was isolated by evaporating the water. The highly cross-linked copolymer dyed heavily with acetate, acid wool and direct dyes. It could be resuspended as a colloid in dimethylformamide, acetone, alcohols and glycols. The dyed copolymer was useful as a colored pigment.

*Example 8*

A mixture consisting of 44.0 g. of methacrylonitrile, 6.0 g. of allyloxamic acid n-butylhydrazide, 1.0 g. low viscosity polyvinyl alcohol, 0.5 g. of benzoyl peroxide and 500 cc. of water was placed in a bottle and tumbled at 60°– 70° C. for 18 hours. The copolymer product obtained consisted of small, clear beads which were filtered off and washed. The copolymer was soluble in acetone and in cyclohexanone. Films cast therefrom dyed well with acetate and acid wool dyes.

*Example 9*

A copolymer of 89% by weight of acrylonitrile and 11% by weight of allyloxamic methyl, isopropylhydrazide was prepared by the process described in Example 1. The yield was 83%. Fibers spun therefrom had a softening point of 210° C. and dyed well with acetate and acid wool dyes.

*Example 10*

A mixture consisting of 70.0 g. of methyl methacrylate, 10.0 g. of allyloxamic acid dimethylhydrazide, 0.8 g. of azo-bis-isobutyronitrile, 0.8 g. of polymethacrylic acid, 8.0 g. of disodium hydrogen phosphate $$Na_2HPO_4 \cdot 12H_2O$$

and 200 cc. of water was placed in a bottle and the mixture tumbled at 55° C. for 18 hours. The copolymer product was filtered off, washed and dried. It weighed 71 g. The copolymer was soluble in acetone, in ethyl acetate and in carbon tetrachloride. Films cast therefrom had a softening point of 135° C.

*Example 11*

Using the general methods described above, a ternary copolymer was made having the weight composition of 50% of acrylonitrile, 40% of vinylidene chloride and 10% of allyloxamic acid dimethylhydrazide. The copolymer was soluble in acetone. Fibers spun from the acetone solution dyed well with cellulose acetate dyes, acid wool dyes and premetallized dyes.

The following examples illustrate that the copolymeric hydrazides of the invention may also be derived from various copolymers of alkyl allyloxamates by treating these copolymers with hydrazine or with various derivatives thereof. The intermediate copolymers of alkyl allyloxamates are described in our copending application Serial No. 578,897, filed of even date herewith.

Example 12

A cross-linked copolymer was prepared by placing in a flask a mixture consisting of 4 g. of ethyl allyloxamate, 14 g. of N,N-dimethylacrylamide, 2 g. of divinylbenzene, 0.2 g. of potassium persulfate, 0.2 g. of sodium bisulfite, 0.4 g. of sodium lauryl sulfate and 150 cc. of water, and the emulsion stirred rapidly at 55°–60° C. for 4 hours. The copolymer product obtained contained approximately 20% by weight of ethyl allyloxamate and was a highly cross-linked copolymer in a water suspension. To this were added 15 parts of hydrazine per 100 parts of the copolymer in suspension, and the mixture stirred at 50°–55° C. for 3 hours. Then 3 parts of an acid wool dye was added and the temperature raised to 90°–100° C. for one hour. The dyed product was isolated by evaporating the water. The deeply dyed pigment obtained could be suspended in colloidal form in acetone, in dimethylformamide, in alcohols such as ethanol and in glycols such as ethylene glycol.

In place of the ethyl allyloxamate in the above example there can be substituted an equivalent amount of any of the other mentioned alkyl allyloxamates to give copolymeric hydrazides having generally similar properties.

Example 13

Fibers spun from a copolymer having a composition consisting of 60% of vinyl chloride, 30% of acrylonitrile and 10% of ethyl allyloxamate were soaked in a 10% solution of hydrazine for 30 minutes at room temperature. They were not dissolved by the treatment. They dyed well with acid wool dyes, direct cotton dyes and premetallized dyes.

By following the procedures of the above examples other generally similar resinous copolymers can be prepared with any of the mentioned allyloxamic acid hydrazides and the mentioned comonomers, in the specified range of proportions. The solutions of the copolymers of the invention from which readily dyeable films and fibers can be prepared may contain, if desired, additional modifying materials such as fillers, plasticizers, dyes, etc. The copolymers and compositions thereof can be cast, extruded or spun from their solutions and molding compositions thereof can be worked into stable, shaped objects by conventional molding methods.

What we claim is:

1. A copolymer of from 4 to 30% by weight of an allyloxamic acid hydrazide represented by the following general formula:

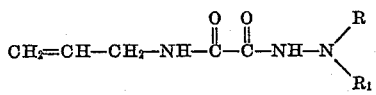

wherein R and R₁ each represents a member selected from the group consisting of a hydrogen atom, an alkyl group containing from 1 to 4 carbon atoms, a phenyl group and a tolyl group, and from 96 to 70% by weight of a different polymerizable, unsaturated monomer containing at least one aliphatic —CH=C< group.

2. A copolymer of from 4 to 30% by weight of allyloxamic acid hydrazide and from 96 to 70% by weight of acrylonitrile.

3. A copolymer of from 4 to 30% by weight of allyloxamic acid phenylhydrazide and from 96 to 70% by weight of vinylidene chloride.

4. A copolymer of from 4 to 30% by weight of allyloxamic acid n-butylhydrazide and from 96 to 70% by weight of vinyl chloride.

5. A copolymer of from 4 to 30% by weight of allyloxamic acid diphenylhydrazide and from 96 to 70% by weight of methyl acrylate 6. A copolymer of from 4 to 30% by weight of allyloxamic acid dimethylhydrazide and from 96 to 70% by weight of methyl methacrylate.

7. A process for preparing a copolymer of an allyloxamic acid hydrazide represented by the following general formula:

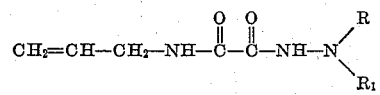

wherein R and R₁ each represents a member selected from the group consisting of a hydrogen atom, an alkyl group containing from 1 to 4 carbon atoms, a phenyl group and a tolyl group, which comprises heating in the presence of a polymerization catalyst a mixture containing as the sole polymerizable components from 4 to 30% by weight of the said allyloxamic acid hydrazide and from 96 to 70% by weight a different polymerizable, unsaturated monomer containing at least one aliphatic —CH=C< group.

8. A process for preparing a copolymer of allyloxamic acid hydrazide and acrylonitrile, which comprises heating in the presence of a polymerization catalyst a mixture containing as the sole polymerizable components from 4 to 30% by weight of allyloxamic acid hydraxide and from 96 to 70% by weight of acrylonitrile.

9. A process for preparing a copolymer of allyloxamic acid phenylhydraxide and vinylidene chloride which comprises heating in the presence of a polymerization catalyst a mixture containing as the sole polymerizable components from 4 to 30% by weight of allyloxamic acid phenylhydrazide and from 96 to 70% by weight of vinylidene chloride.

10. A process for preparing a copolymer of allyloxamic acid n-butylhydrazide and vinyl chloride which comprises heating in the presence of a polymerization catalyst a mixture containing as the sole polymerizable components from 4 to 30% by weight of allyloxamic acid n-butylhydrazide and from 96 to 70% by weight of vinyl chloride.

11. A process for preparing a copolymer of allyloxamic acid diphenylhydrazide and methyl acrylate which comprises heating in the presence of a polymerization catalyst a mixture containing as the sole polymerizable components from 4 to 30% by weight of allyloxamic acid diphenylhydrazide and from 96 to 70% by weight of methyl acrylate.

12. A process for preparing a copolymer of allyloxamic acid dimethylhydrazide and methyl methacrylate which comprises heating in the presence of a polymerization catalyst a mixture containing as the sole polymerizable components from 4 to 30% by weight of allyloxamic acid dimethylhydrazide and from 96 to 70% by weight of methyl methacrylate.

References Cited in the file of this patent

UNITED STATES PATENTS

| | | |
|---|---|---|
| 2,313,565 | McDowell et al. | Mar. 9, 1943 |
| 2,531,410 | D'Alelio | Nov. 28, 1950 |
| 2,533,204 | Caldwell | Dec. 12, 1950 |
| 2,566,250 | Reynolds et al. | Aug. 28, 1951 |
| 2,626,944 | Coover et al. | Jan. 27, 1953 |
| 2,686,173 | Sauer | Aug. 10, 1954 |
| 2,734,888 | D'Alelio | Feb. 14, 1956 |